Figure 1:
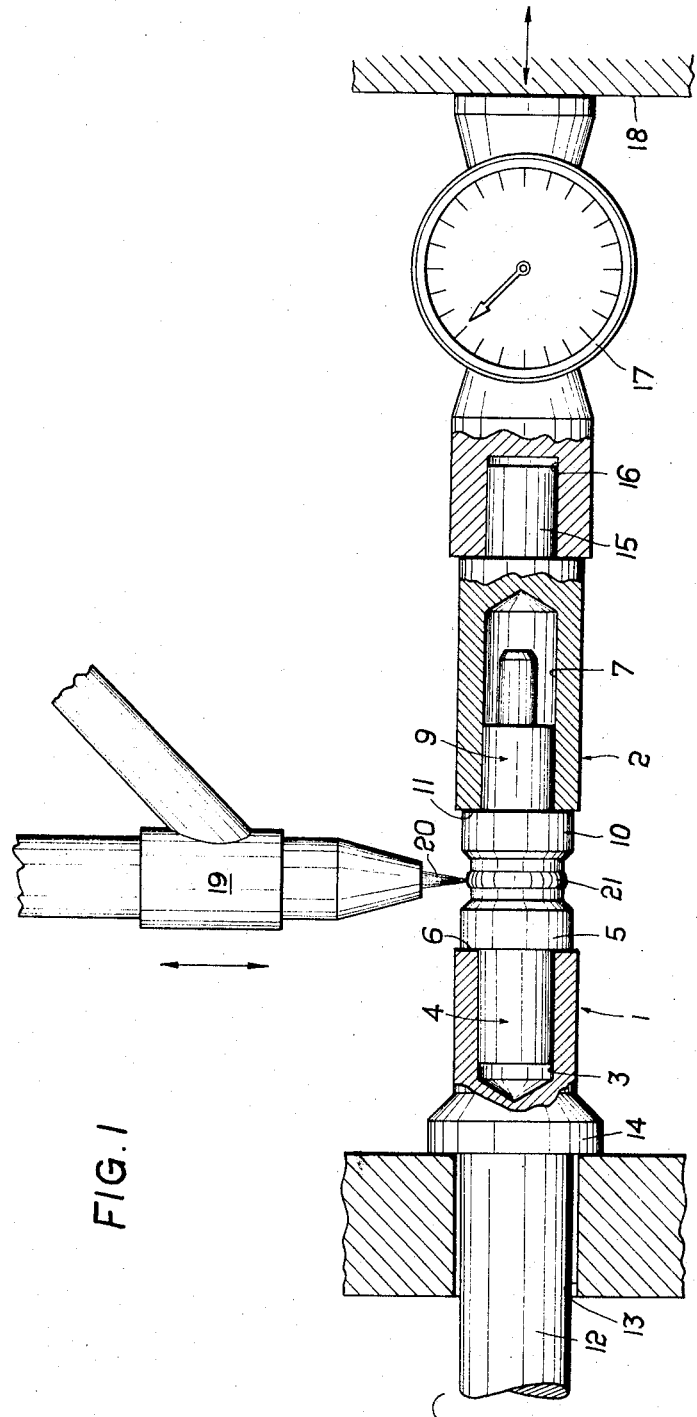

United States Patent [19]
Zieringer

[11] 3,733,661
[45] May 22, 1973

[54] METHOD FOR THE MANUFACTURE OF A PIEZOELECTRIC TRANSDUCER AND TRANSDUCER MANUFACTURED BY THIS METHOD

[75] Inventor: Rudolf Zieringer, Graz, Austria

[73] Assignee: Hans List, Graz, Austria

[22] Filed: Jan. 25, 1971

[21] Appl. No.: 109,443

Related U.S. Application Data

[62] Division of Ser. No. 778,936, Nov. 26, 1968, abandoned.

[52] U.S. Cl. .................29/25.35, 29/497.5, 29/593, 310/8.7
[51] Int. Cl. ...........................B01j 17/00, H04r 17/00
[58] Field of Search.....................29/25.35, 497.5, 29/446, 407, 593; 310/9.2, 9.3, 8.7

[56] References Cited

UNITED STATES PATENTS

| | | | |
|---|---|---|---|
| 2,486,482 | 11/1949 | LaBrie | 310/9.2 X |
| 2,453,435 | 11/1948 | Havstad | 310/9.2 X |
| 3,621,547 | 11/1971 | Durham | 29/25.35 |

*Primary Examiner*—Charles W. Lanham
*Assistant Examiner*—Carl E. Hall
*Attorney*—Watson, Cole, Grindle & Watson

[57] ABSTRACT

Method and apparatus for the manufacture of piezoelectric transducers in which a tube spring is prestressed by an axial load with the tube welded to a transducer housing member.

3 Claims, 9 Drawing Figures

Inventor
Rudolf Zeiringer
By Watson, Cole, Grindle & Watson
Attys.

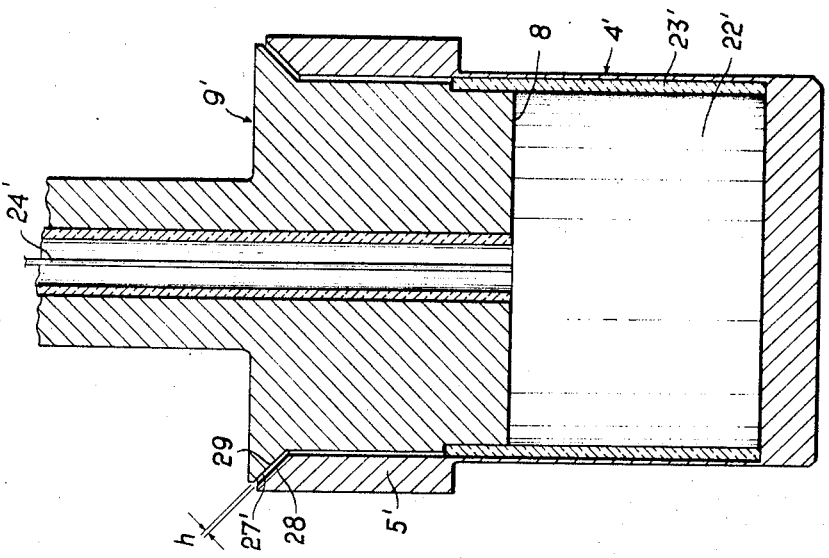
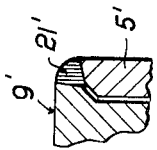
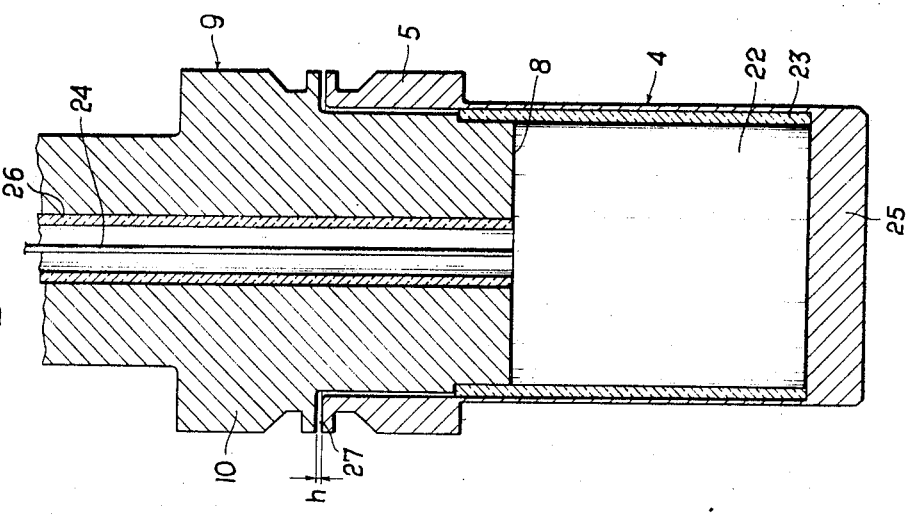
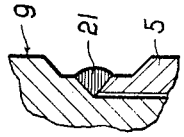

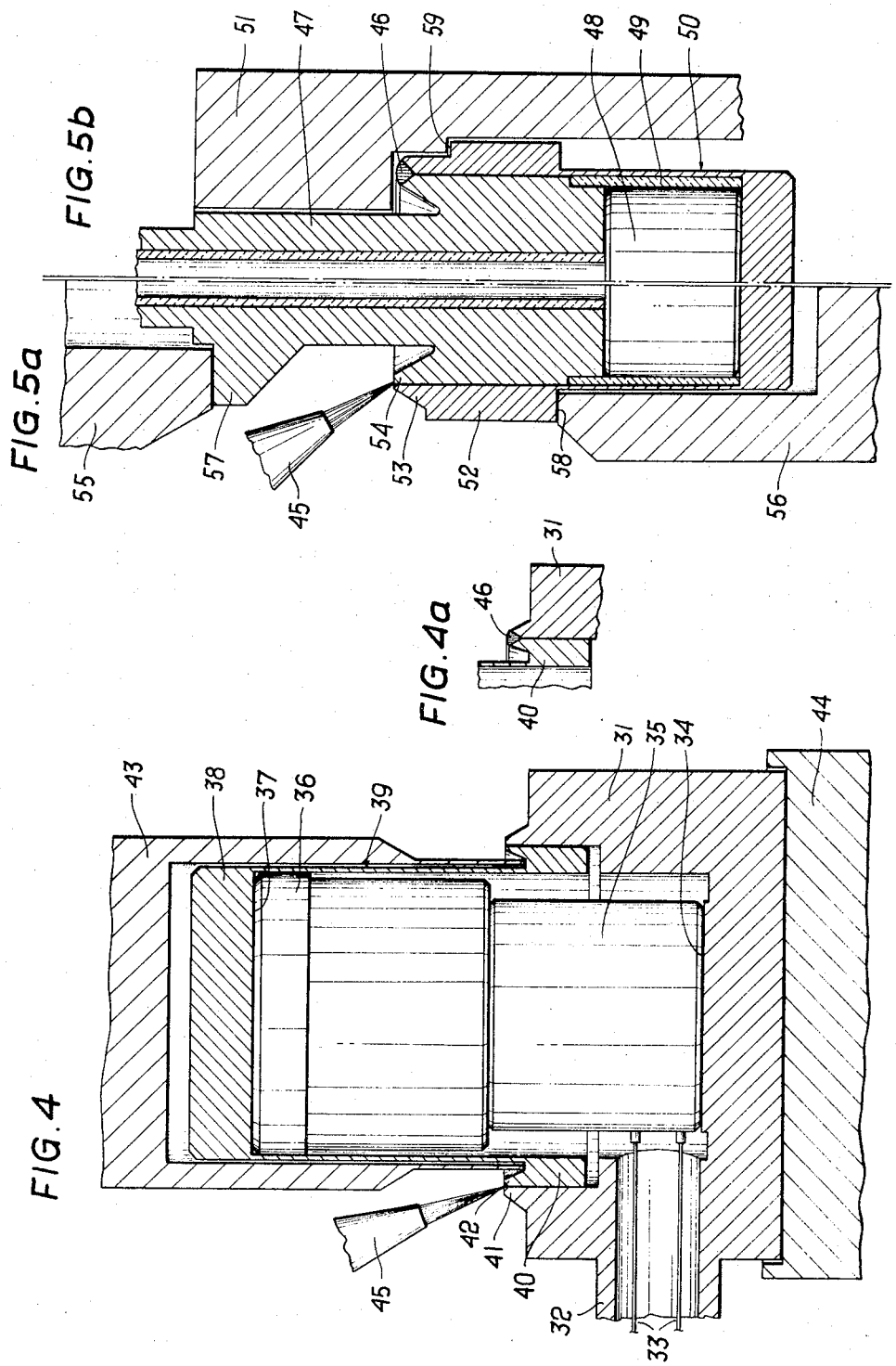

METHOD FOR THE MANUFACTURE OF A PIEZOELECTRIC TRANSDUCER AND TRANSDUCER MANUFACTURED BY THIS METHOD

This is a division of application Ser. No. 778,936, filed Nov. 26, 1968 now abandoned.

The invention relates to a process for the manufacture of a piezoelectric transducer with a piezoelectric measuring element inserted in a tube spring and held under axial prestress between the inner front end of the bottom of the tube spring and a lower end face of the transducer housing or of a transducer housing insert serving as a rigid support, the tube spring being advanced with its open end close to the transducer housing or to the transducer housing insert until such time when the measuring element directly adjoins the said end face, whereupon the extremity of the tube spring is welded to the transducer housing or to the transducer housing insert under an axial load directed against the end face, thereby producing an annular tightly closed welding seam, the axial load being set prior to the completion of the welding operation to a value corresponding to the prestress of the measuring element, on the one hand, and to an apparatus for the performance of this method of manufacture and to transducers manufactured by this method on the other hand.

Various expedients have already been devised for the purpose of producing a certain predetermined prestress in connection with transducers wherein the axial prestress of the measuring element required for the determination of values included in the negative measuring range, of values that is, tending to relieve the measuring instrument, is produced by means of a tube spring. However, these conventional methods are beset with a number of drawbacks.

It is possible, for example, in connection with conventional types of transducers comprising a tube spring screwed to the transducer housing, to set the required prestress with a high degree of precision by appropriately screwing the tube spring. However, the provision of a screw-coupling between the tube spring and the transducer housing fails to assure hermetic sealing of the interior of the transducer containing the measuring element against the outside as is indispensable for a continuously smooth operation of the instrument. Furthermore, the originally set prestress is liable to alterations in the long run due to slackening of the screw-coupling.

According to another known method, the tube spring collar is pressed into a housing and secured therein by flanging. In that case, the required prestress can be set to an approximate value only with the necessity of observing very narrow tolerances in length with regard to the structural elements to be joined together. This design too, lacks the necessary hermetic sealing.

Another method used for the manufacture of transducers consists in setting the measuring element clamped between the bottom of the tube spring and the support to the required prestress and in securing the tube spring by spotwelding at several points of its periphery to the transducer housing insert defining the supporting surface. However, apart from the lack of hermetic sealing of the coupling, this method is relatively unsafe since during the cooling of the welds, thermal stresses are likely to alter the prestress setting.

Better results are achievable by means of the aforesaid process wherein the provision of a closed annular welding seam ensures the required hermetic sealing of the interior of the transducer. However, this known method also involves a number of insecurity factors, particularly with regard to the obtention of an accurately predetermined prestress of the measuring element, due to the fact that the measuring element is prestressed only in the course of the welding operation as a result of the progressive approach of the transducer elements to be welded together and subject to a relative axial stress. Consequently, even if the axial stress acting upon the transducer elements clamped between the hollow electrodes of a resistance-welding apparatus is accurately controlled, the prestress produced in the measuring elements upon completion of the welding operation may occasionally differ, however slightly, from the predetermined theoretical value. The amount of prestress is furthermore influenced by other factors ascribable to differences in the dimensions of the structural elements to be welded together and also to fluctuations of amperage and of the duration of voltage application as well as to variations of the mechanical welding pressures applied.

It is the object of the present invention to avoid the aforesaid shortcomings of known methods of manufacture and to provide a method for the manufacture of piezoelectric transducers suitable for serial production, ensuring both the accurate observation of a predetermined amount of prestress and the absolutely hermetic sealing of the interior of the transducer. In conjunction with the known manufacturing process mentioned above, according to the invention the tube spring is therefore, advanced towards the transducer housing or transducer housing insert and then subject to the full predetermined prestress by means of an axial load, whereupon the tube spring is connected with the transducer housing or transducer housing insert by arc welding, particularly by plasma welding, while the full prestress is maintained all the time.

An essential advantage is derived from this process insofar as the welding operation proper will practically not interfere with the predetermined prestress which is maintained in a simple manner until the end of the welding operation. In particular, the arc welding method is responsible for a local rise in temperature of the transducer components to be welded together which is, however, kept within narrow limits, so that stress variations due to thermal expansion are practically completely avoided.

As compared with conventional methods, the process according to the invention offers the additional advantage that it is not absolutely necessary for the manufacture of the tube spring and of the finishing of the corresponding counter-surface of the transducer housing or of the transducer housing insert to strictly adhere to narrow tolerances in the length of these structural elements.

Another outstanding feature of the present invention resides in the use of the plasma-welding process which is known to produce an almost pin-point concentration of an arc of extraordinary stability and furthermore permitting the application of extremely low amperages.

According to a further embodiment of the invention the prestress of the measuring element is preferably continuously measured in conjunction with the same in a manner known per se and automatically adjusted as a function of the measured value so as to obtain the predetermined theoretical value. As a result of the automation of this operation which is essential for the production of the required prestress, any deviations of the final prestress of the measuring element from the predetermined value due to operating errors or other individual influences are avoided. Besides, the manufacturing process is simplified and shortened.

According to a preferred embodiment of the invention the apparatus by which the latter is to be performed comprises two holders arranged opposite and in coaxial relation to each other and displaceable in relation to each other and to be loaded by opposing stresses, the said holders serving for the tube spring containing the measuring element and the transducer member comprising the supporting surface, as well as an electric welding apparatus comprising an arc-type, particularly a plasma-type welding burner. By means of the apparatus it is possible to mechanize the manufacture of a transducer by the method according to the invention and even to provide for an automatic manufacturing process by means of an appropriate program device.

Another preferred embodiment of the invention provides for the rotatable arrangement of one of the two holders on a fixed support, whereas the other holder is rotatably arranged on an axially displaceable abutment, preferably with the interposition of a dynamometer. In that case, it is possible for the welding burner to be secured to a mount permitting only the conveyance of the burner to, and its removal from, the workpiece. In this connection, it is advisable according to another feature of the invention, to provide at least one of the two holders with a rotary drive tuned to the admissible advance speed of the welding burner. This rotary drive can be included in a simple manner in a program control for the purpose of controlling the ignition of the arc of the welding burner at the beginning of the continuous rotation of the workpiece and the switchoff of the welding burner as soon as the workpiece has completed a full revolution.

In a piezoelectric transducer produced by the method according to the invention and provided with a piezoelectric measuring element inserted in a tube spring and held under axial prestress between the inner front end of the bottom of the tube spring and a lower end surface of the transducer housing or of the transducer housing insert serving as a rigid support, the open end of the prestressing sleeve may encompass part of the transducer housing or of the transducer housing insert and form a gap with same at their junction, the said gap being bridged by the annular welding seam. This gap ensures the formation of a deep-reaching welding seam since it facilitates the penetration of the burner jet. In order to take full advantage of the opportunities offered by the method according to the invention, it is advisable to provide for small cross-sectional areas for the connection of the structural elements to be welded together in the area of the gap formed by same, either by the provision of characteristic welding flanges on these transducer components or by having the cross-sectional areas of same diminish in the direction of the gap.

According to another embodiment of the invention the transducer housing and/or the transducer housing insert and the open end of the tube spring each have an annular extension protruding in the direction of the same side of the transducer, one extension surrounding the other and the welding seam extending in the area of the adjacent front edges of the two extensions. The provision of characteristic annular extensions on the transducer components to be interconnected makes it possible for the cross-sectional areas in these places which are directly exposed to the burner jet to be kept as small as possible in order to check heat conduction towards the remaining components of the transducer, thereby accelerating the welding operation.

In line with this trend, the cross-sectional area of the extensions is preferably so designed as to diminish in the direction of their free front end.

According to a particularly simple design of the transducer according to the present invention which is particularly suitable for purposes of serial production, the extension having the smaller diameter is defined by an annular groove recessed in the associated transducer member.

Further details of the invention will appear from the following description of the several embodiments of the invention with reference to the accompanying drawing in which FIG. 1 is a schematic sectional view showing the basic structure of an apparatus for the performance of the method according to the invention, FIG. 2 is a vertical sectional view of a piezoelectric pressure transducer manufactured in accordance with the method according to the invention, prior to the welding operation, FIG. 2a a detail of the pressure transducer as shown in FIG. 2 after the welding operation, FIG. 3 a variant of a transducer manufactured in accordance with the same method, prior to the welding operation, FIG. 3a a detail of the same transducer after the welding operation, FIG. 4 an axial cross-sectional view of a piezoelectric accelerometer produced in accordance with the method according to the invention prior to the welding operation, and FIG. 4a a detail of this apparatus after the welding operation, FIGS. 5a and 5b two consecutive stages of the process for the manufacture of a piezoelectric pressure transducer mounted in accordance with the method according to the invention.

The apparatus shown in FIG. 1 comprises two holders 1 and 2 in opposite coaxial relation to each other and stepped-down cylindrical in shape, one holder 1 containing in a blind bore 3 the tube spring 4 of the piezoelectric transducer to be manufactured with the measuring element (not shown) inserted therein. The tube spring 4 rests with an annular shoulder defined by its reinforced inner rim 5 upon the annular front end 6 of the holder 1.

Inserted in a corresponding blind bore 7 of the second holder 2 is the transducer member, in the embodiment shown a transducer housing insert 9 comprising the rigid support 8 (to be seen in FIG. 2). The transducer housing insert 9 rests with a flange 10 on the annular front end 11 of the holder 2.

The holder 1 with its cylindrical shaft 12 is rotatably arranged in a fixed support 13 and rests with a collar 14 axially upon the inner front end of this fixed support 13.

The holder 2 is likewise rotatable and for that purpose inserted with its stepped-down cylindrical shaft 15 in a bearing 16 of easy action located at one end of a dynamometer 17 arranged in coaxial relation to the two holders 1 and 2, the other end of the said dynamometer resting on an axially adjustable abutment 18. Obviously, it is possible for the mechanical dynamometer 17 shown to be replaced by a load measuring cell or the like.

The apparatus illustrated in FIG. 1 further comprises an electric welding burner which in this case is designed as a plasma-type welding burner 19, the longitudinal axis of which is perpendicular to the axis of rotation of the two holders 1 and 2. The welding burner 19 is adjustable in an axial direction in the sense of the double arrow shown. The burner jet 20 formed by a necked-down electric arc produced in a highly ionized gaseous envelope is directed to the very junction between the tube spring 4 and the transducer insert 9. The annular welding seam produced by the burner 19 at the junction is designated by reference number 21.

Referring to FIGS. 2 and 2a illustrating a piezoelectric transducer manufactured in accordance with the method according to the invention in two different production stages before the welding operation (FIG. 2) and upon completion of the welding operation (FIG. 2a) the process according to the invention will hereafter be described as follows:

At the beginning, the measuring element 22 provided with a central connecting line 24 for the abduction of the charges produced is inserted in the tube spring 4 together with the surrounding insulating sleeve 23 so as to rest with its inner front end on the bottom 25 of the tube spring 4. Now the tube spring 4 is inserted in the blind bore of holder 1. The holder 2 receives the transducer housing insert 9 provided with central longitudinal bore comprising an insulating tube 26.

The tube spring 4 and the transducer housing insert 9 are now brought close to each other by appropriately shifting the abutment 18 until such time when the outer front end of the measuring element 22 comes into contact with the support 8 defined by the front end of the transducer housing insert 9. As shown in the left half of FIG. 2, a gap 27 of a width "h" is left at the junction between the tube spring 4 and the transducer insert 9.

Now the apparatus is axially loaded by the additional displacement of the abutment 18, as a result of which a prestress is produced in the measuring element 22 clamped between the bottom 25 of the tube spring and the support 8. This prestress is immediately made to correspond with the predetermined theoretical value in accordance with the reading of the dynamometer 17. Thereupon the welding burner 19 is brought within ignition distance from the gap 27 and the main arc ignited. As the welding operation begins, the shaft 12 of the holder 1 and consequently, the workpiece together with the holder 2 are rotated continuously as the welding operation proceeds. The burner jet penetrating as far as the gap 27 produces a tight homogeneous annular weld 21, bridging the gap (cf. FIG. 2a). Due to the high concentration of the arc 20, heating of the workpiece is restricted to the area directly adjoining the welding seam. The preset prestress of the measuring element is fully maintained during the welding operation. It is also possible for this process to be automatically controlled, using the reading of the dynamometer 17 as a control quantity. It is, however, also possible to use the charge produced in the measuring element 22 under the set prestress in a manner known per se as a control quantity for the purpose of maintaining the predetermined prestress at a constant level.

As soon as the annular welding seam 21 is closed following a complete revolution of the shaft 12, the welding burner 19 is switched off and moved back to its original position. Now the abutment 18 is also brought into its original position, whereupon the welded transducer is removed from the mounts 1 and 2.

The transducer illustrated in FIG. 2 is manufactured by the same method. The tube spring 4' containing the measuring element 22' together with the connecting line 24' and an insulating sleeve 23' differs from the type shown in FIG. 2 insofar as its reinforced rim 5' has a conical annular front face 28 defining in conjunction with a corresponding conical surface 29 of the transducer housing insert 9' a gap 27'. The annular welding seam 21' shown in FIG. 3a is then produced in the area of this gap 27'. The apparatus used for the welding of this transducer differs from the type shown in FIG. 1 only insofar as the welding burner 19 is placed in an oblique position pointing in the direction of the gap 27'.

The accelerometer shown in FIG. 4 comprises a hollow cylindrical housing 31 with a connecting flange 32 (only part of which is shown in the drawing), through which the two connecting lines 33 of the measuring element 35 resting on the inner front end 34 of the housing bottom emerge. The measuring element 35 can be designed for example, as a conventional assembly of superposed quartz disks with electrode coatings.

The seismic mass 36 loading the measuring element 35 rests upon the inner front end 37 of the bottom 38 of a tube spring 39 surrounding the measuring unit and engaging with its open reinforced end 40 in the receiving bore of the transducer housing 31.

The housing 31 as well as the end 40 of the tube spring each have an upwardly protruding annular extension 41 and 42 respectively, whose cross-sectional area diminishes in the direction of the free front end.

For the assembly of the accelerometer the same is clamped between two pressure feet 43 and 44 (indicated by dot-and-dash lines) of an auxiliary device (not shown) and loaded by an axial force producing a predetermined amount of prestress in the measuring element. While this load is maintained, the jet of a plasma-type welding burner 45 also indicated by dot-and-dash lines in the drawing is directed upon the free front end of the extensions 41 and 42 in such a manner that it impinges upon the contact edge of the two extensions.

In order to produce a closed annular welding seam, the burner 45 is moved about the longitudinal axis of the transducer, or, where a stationary burner is used, the transducer is axially rotated by means of the two pressure feet 43 and 44. Upon completion of the welding seam 46 (FIG. 4a) and after releasing the clamping by the two pressure feet, the assembly of the accelerometer is terminated. Following cleaning and finishing of the weld where necessary, the apparatus is ready for use.

FIGS. 5a and 5b illustrates a piezoelectric pressure transducer wherein a housing insert 47 and the tube spring 50 containing the measuring element 48 together with an insulating sleeve 49 constitute the two transducer elements to be welded together, which upon completion of the welding operation are jointly inserted in a transducer housing 51 (indicated by dash-lines).

The reinforced extremity 52 of the tube spring and the housing insert 47 present annular extensions 53 and 54 directed towards the same side of the transducer and are of a similar design as in the embodiment of the invention hereabove described and illustrated in and by FIG. 4. Likewise, the transducer is assembled by clamping the transducer elements to be welded together between the pressure feet 55 and 56 (indicated by dash-lines) of an auxiliary device (FIG. 5a). For that purpose, the housing insert 47 is provided with a collar 57 in which the pressure foot 55 engages. The other pressure foot 56 rests upon the annular shoulder 58 defined by the reinforced extremity 52 of the tube spring 50. The method of prestressing and welding by means of the burner 45 is similar to that described with reference to the aforesaid embodiments of the invention, but for the finishing of the shells of the housing insert 47 and of the extremity 52 of the tube spring following completion of the welding operation, whereby the collar 57 is removed by turning and a shoulder 59 is produced at the extremity 52 of the tube spring serving as an axial abutment of the transducer housing 51 for the final assembly of the pressure transducer (FIG. 5b).

It is obviously possible for the method according to the invention to be performed also with devices other than the apparatus hereabove described and as shown in the drawings. For example, non-rotatable holders can be provided for the clamping of the transducer elements to be welded together, with the welding burner rotating about the common longitudinal axis of these holders as required. The devices used for that purpose may be either hand-operated or automatically operated by means of a program control system.

I claim:

1. A method for the manufacture of a piezoelectric transducer having a transducer housing, a rigid support formed by the front end of the housing, a cylindrical outer surface of the housing concentric with respect to the longitudinal axis of the transducer, a tube spring having an open end facing the support and a bottom at its opposite end, a cylindrical counter-surface concentric with the longitudinal axis of the transducer at the open end of the tube spring and registering with the cylindrical surface of the transducer housing, a piezoelectric measuring element mounted between the support and the bottom of the tube spring and axially prestressed therebetween, and an annular weld on the open end of the tube spring adjoining the cylindrical counter-surface thereof, comprising the steps of:

1. joining the tube spring with the transducer housing member adjacent to said cylindrical surface and said cylindrical counter-surface so that the measuring element abuts against said support and against the tube spring bottom,
2. prestressing the measuring element with a measured axial load upon the transducer housing and the tube spring, and
3. welding the open tube spring end to the transducer housing member adjacent welding edges of these members to provide an annular closed weld contiguous to said first-mentioned welding edges, said welding being performed simultaneously with continuously measuring the prestressed load of said measuring element by means of the measuring element and automatically regulating the axial load as a function of said measured prestress to maintain said prestress equivalent to a predetermined theoretical prestress during the welding process.

2. The method according to claim 1 wherein the welding process is performed by arc welding.

3. A method according to claim 1 wherein the welding process is performed by plasma arc jet welding.

* * * * *